United States Patent
Blackburn (10) Patent No.: US 12,192,054 B1
(45) Date of Patent: Jan. 7, 2025

(54) AUTOMATED PROVISIONING OF TEMPORARY COMMUNICATION SYSTEMS

(71) Applicant: Wells Fargo Bank, N.A., San Francisco, CA (US)

(72) Inventor: Justin Blackburn, Litchfield Park, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/333,913

(22) Filed: Jun. 13, 2023

(51) Int. Cl.
  *H04L 41/08* (2022.01)
  *H04L 9/40* (2022.01)
  *H04L 67/00* (2022.01)

(52) U.S. Cl.
  CPC ...... *H04L 41/0886* (2013.01); *H04L 63/0823* (2013.01); *H04L 67/34* (2013.01)

(58) Field of Classification Search
  CPC .. H04L 41/0886; H04L 63/0823; H04L 67/34
  See application file for complete search history.

(56) References Cited

U.S. PATENT DOCUMENTS

| | | | |
|---|---|---|---|
| 7,817,982 B1 * | 10/2010 | Chu | G08B 27/006 455/452.2 |
| 8,069,471 B2 | 11/2011 | Boren | |
| 8,572,735 B2 | 10/2013 | Ghosh et al. | |
| 8,635,490 B2 | 1/2014 | Narayanaswamy et al. | |
| 9,426,834 B2 | 8/2016 | Greene et al. | |
| 9,454,592 B2 | 9/2016 | Mills et al. | |
| 9,501,541 B2 | 11/2016 | Doering et al. | |
| 9,906,500 B2 | 2/2018 | O'Hare et al. | |
| 10,225,269 B2 | 3/2019 | Yi | |
| 10,637,994 B2 | 4/2020 | Amin et al. | |
| 10,762,204 B2 | 9/2020 | Yuen et al. | |
| 10,904,288 B2 | 1/2021 | Robertson | |
| 2006/0149842 A1 | 7/2006 | Dawson et al. | |
| 2007/0210909 A1 | 9/2007 | Addy | |
| 2010/0306772 A1 | 12/2010 | Arnold et al. | |
| 2012/0131226 A1 | 5/2012 | Stevens et al. | |

(Continued)

OTHER PUBLICATIONS

U.S. Appl. No. 18/347,789, filed Jul. 6, 2023.

(Continued)

*Primary Examiner* — Chris Parry
*Assistant Examiner* — Steven C Nguyen
(74) *Attorney, Agent, or Firm* — Merchant & Gould P.C.

(57) ABSTRACT

An example computer system for providing a communication system can include: one or more processors; and non-transitory computer-readable storage media encoding instructions which, when executed by the one or more processors, causes the computer system to: receive a command to create the communication system based upon an event; automatically install and provision the communication system in a cloud computing environment; provide an event management microservice programmed to track issues associated with the computer system, including provisioning the event management microservice with one or more tickets based upon a type of the event; and provide a communication microservice programmed to facilitate communications between users of the communication system, including provisioning the event management microservice with one or more contacts based upon the type of the event.

18 Claims, 6 Drawing Sheets

(56) References Cited

U.S. PATENT DOCUMENTS

| | | | |
|---|---|---|---|
| 2013/0189944 A1 | 7/2013 | McCoy | |
| 2013/0295891 A1 | 11/2013 | Moon et al. | |
| 2014/0125759 A1 | 5/2014 | Chalasani et al. | |
| 2014/0372805 A1* | 12/2014 | Rijnders | G06Q 10/06311 714/37 |
| 2016/0080248 A1* | 3/2016 | Rijnders | H04L 45/22 709/224 |
| 2016/0219154 A1 | 7/2016 | Veron et al. | |
| 2017/0118092 A1* | 4/2017 | Dixon | H04L 41/0894 |
| 2017/0279826 A1 | 9/2017 | Mohanty et al. | |
| 2017/0353978 A1 | 12/2017 | Ulinskas | |
| 2018/0054427 A1 | 2/2018 | Revell | |
| 2018/0060153 A1* | 3/2018 | Innes | H04L 41/06 |
| 2019/0147089 A1 | 5/2019 | Megahed et al. | |
| 2020/0358617 A1 | 11/2020 | Baierlein et al. | |
| 2022/0239568 A1 | 7/2022 | Celozzi et al. | |
| 2022/0353177 A1* | 11/2022 | Mohammad | H04L 41/0895 |
| 2023/0116748 A1* | 4/2023 | Rowe | H04L 41/0654 709/224 |
| 2023/0140789 A1* | 5/2023 | Wenzel | H04L 43/10 709/224 |
| 2023/0308460 A1* | 9/2023 | Thomas | H04L 63/08 |

OTHER PUBLICATIONS

U.S. Appl. No. 18/523,566, filed Nov. 29, 2023.
U.S. Appl. No. 18/587,487, filed Feb. 26, 2024.
Noel Burton-Krahn, HotSwap Network Solutions, pp. 205-212 of the Proceedings of LISA '02: Sixteenth Systems Administration Conference, (Berkeley, CA: USENIX Association, 2002), 8 pages.
U.S. Appl. No. 17/930,207, filed Sep. 7, 2022.

* cited by examiner

AUTOMATED PROVISIONING OF TEMPORARY COMMUNICATION SYSTEMS

RELATED APPLICATION(S)

This patent application is related to U.S. patent application Ser. No. 17/930,207 filed on Sep. 7, 2022, the entirety of which is hereby incorporated by reference.

BACKGROUND

Cyber security events can disrupt internal communications within an entity, such as email, instant messaging, video conferencing, etc. Worse yet, an attack can be on the communication system itself. For instance, an attacker may have control of an email system, which would render it impossible for users to communicate securely to resolve an event. In addition, documentation systems may contain the exact architectural layouts of systems, telling intruders how to prevent engineers from stopping attackers. This can make remediation of such an attack challenging.

SUMMARY

Examples provided herein are directed to automated provisioning of temporary self-provisioning communication systems.

According to aspects of the present disclosure, an example computer system for providing a communication system can include: one or more processors; and non-transitory computer-readable storage media encoding instructions which, when executed by the one or more processors, causes the computer system to: receive a command to create the communication system based upon an event; automatically install and provision the communication system in a cloud computing environment; provide an event management microservice programmed to track issues associated with the computer system, including provisioning the event management microservice with one or more tickets based upon a type of the event; and provide a communication microservice programmed to facilitate communications between users of the communication system, including provisioning the event management microservice with one or more contacts based upon the type of the event.

The details of one or more techniques are set forth in the accompanying drawings and the description below. Other features, objects, and advantages of these techniques will be apparent from the description, drawings, and claims.

DETAILED DESCRIPTION

This disclosure relates to temporary self-provisioning communication services. In the examples provided herein, the communications services allow personnel of an entity to communicate in a secure and reliable manner during a cyber security event.

For instance, during a cyber security event, one or more systems of an entity, such as a business, can be compromised. The impacted systems can include the communication systems of the business. In order to remediate the effects of the cyber security event, personnel of the business need a secure manner by which to communicate. To accomplish this, the communication systems described herein provide a temporary and secure way for the personnel to communicate.

In some examples, the temporary self-provisioning communication services can be secured (e.g., by Transport Layer Security (TLS)) and update-to-date on all patches. The communication services can be standalone (e.g., not relying on other infrastructure to function) and ideally untraceable to the entity. Further, the communication services can be deployed and removed as a single bundle. Other possible characteristics of the communication services include the ability to manage users (including changing of passwords) and be auditable.

In some implementations, the communication services can be implemented on a cloud-based architecture or on physical hardware. The communication services can be implemented on virtual machines. Further, aspects of the communication services are ideally non-attributable to the entity. For instance, any billing associated with the communication services, such as hosting costs, are handled in a manner that is not attributable to the entity. Further, the Domain Name System (DNS) aspects of the communication system, including registration and certificate, are ideally non-attributable to the entity.

In this manner, the example communication services described herein provide a secure and temporary manner by which personnel can communicate during a cyber security event.

Figure 1:
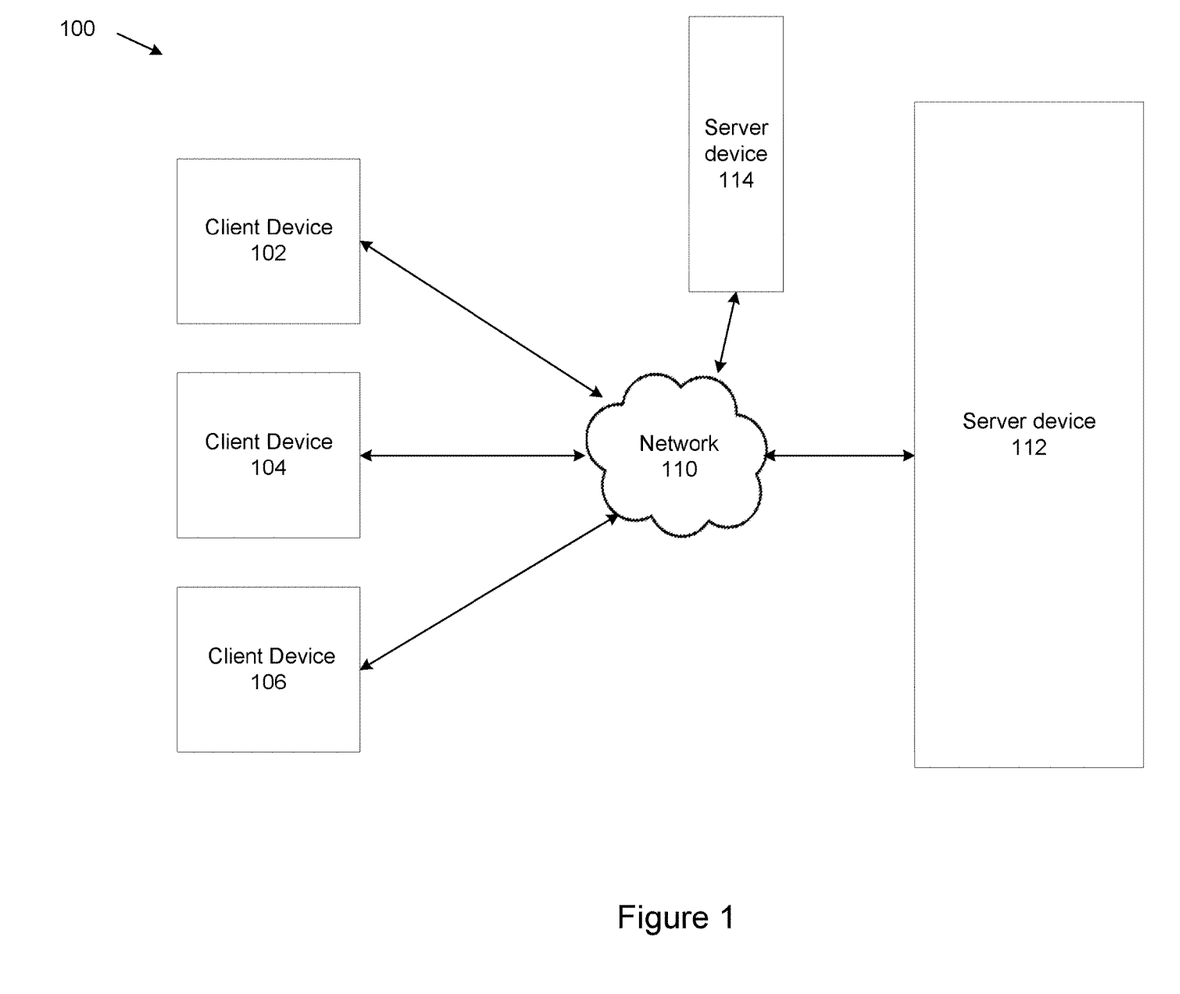
FIG. 1 shows an example system for providing temporary communication services.

FIG. 1 schematically shows aspects of one example system 100 for an entity. The entity can be any type of business. In one non-limiting example, the entity is a financial institution that provides financial services to customers. However, the concepts described herein are equally applicable to other types of entities.

Generally, the system 100 can be a typical computing environment that includes a plurality of client devices 102, 104, 106 and a server device 112. The client devices 102, 104, 106 communicate with the server device 112 to accomplish business tasks.

Each of the client devices 102, 104, 106 and the server device 112 may be implemented as one or more computing devices with at least one processor and memory. Example computing devices include a mobile computer, a desktop computer, a server computer, or other computing device or devices such as a server farm or cloud computing used to generate or receive data.

In the examples shown, the client devices 102, 104, 106 can be used by customers or employees of the business to conduct business. For instance, the client devices 102, 104, 106 can communicate with the server device 112 through a network 110. The server device 112 can be programmed to deliver functionality to the client devices 102, 104, 106. For example, in one embodiment, the server device 112 is one or more computers (typically a server farm or part of a cloud computing environment) that facilitates the various business processes of the entity, along with providing communication services like email, instant messaging, video conferencing, etc.

When a cyber security event occurs, one or more of the client devices 102, 104, 106 and/or the server device 112 can be compromised. An example of such a cyber security event includes a third party (e.g., a malicious actor) gaining access to functionality of the server device 112 through social engineering, an exploit, etc. Once compromised, the functionality provided by the server device 112, including the communication services, may not be trusted.

To remediate the cyber security event, it may be necessary for the entity to perform various actions on the server device 112, including possibly removing accounts, restoring data and programs, reformatting disks, etc. This could impact the communication services provided by the server device 112, further complicating the remediation tasks.

Figure 2:
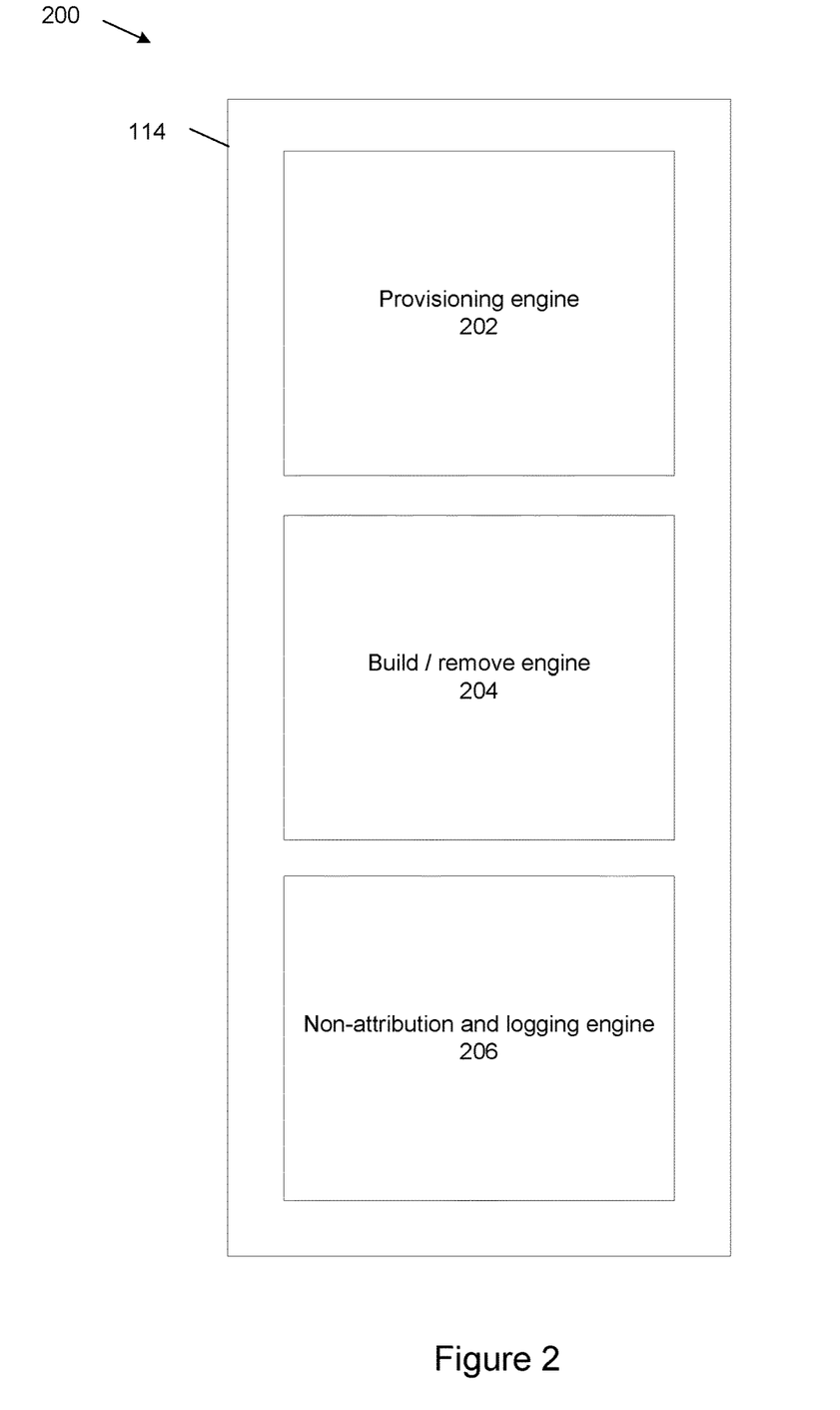
FIG. 2 shows example logical components of a communication system of the system of FIG. 1.
Figure 3:
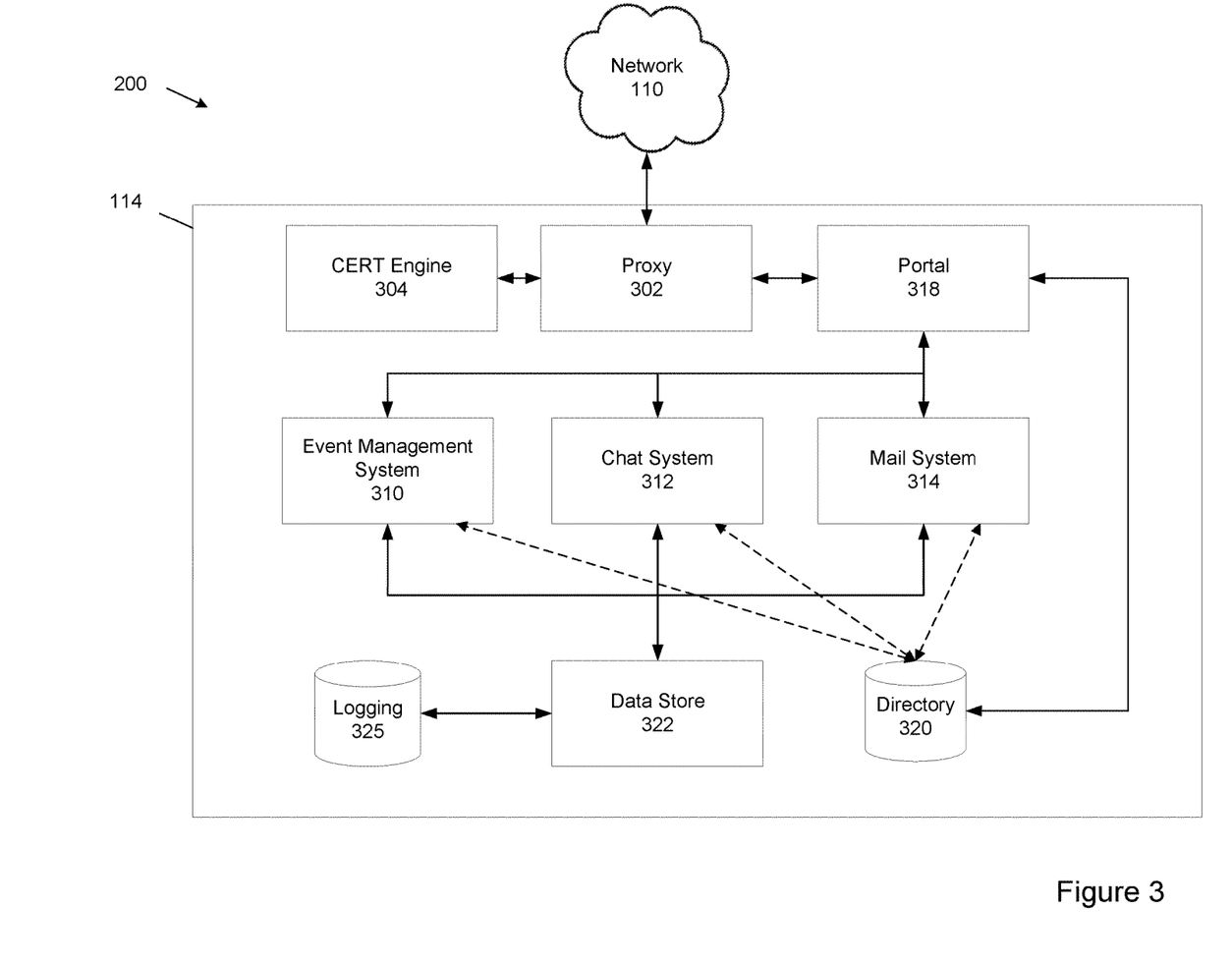
FIG. 3 shows an example logical view of the communication system of FIG. 2.

Referring now to FIGS. 1-3, due to the breach of trust and possible interruptions in the communication services for the server device 112, a separate server device 114 is provisioned that is generally programmed to provide a temporary self-provisioning communication system 200. In generally, the communication system 200 is programmed to provide communication services between the client devices 102, 104, 106 during a cyber security event.

In this example, the server device 114 is hosted by an entity that is ideally unassociated with the entity owning the system 100. For instance, the server device 114 can be a cloud computing resource hosted by a third party, such as Amazon Web Services, Google Cloud Platform, or Microsoft Azure.

The communication system 200 can be container-based such that it can be run on a variety of platforms, including physical servers, virtual machines, and cloud-computing environments. This allows the communication system 200 to use micro-services to implement functionality. For instance, each application of the communication system 200 can be a sub-contained microservice that communicates with the other services of the communication system 200. This allows the microservices to work within any cloud environment and be transportable, such as by moving one or more of the microservices to a different hosting location. Examples of such container-based solutions include, without limitation: Kubernetes, Docker, Podman, rtk, Containerd, etc.

In this example, the communication system 200 is executed on a virtual machine running on the server device 114. The communication system 200 can include a provisioning engine 202, a build/remove engine 204, and a non-attribution and logging engine 206.

The example provisioning engine 202 is programmed to handle all the provisioning of the communication system 200. In one example, the provisioning engine 202 uses an infrastructure as code tool such as Terraform from HashiCorp to build and provision the communication system 200 on the server device 114.

This provisioning by the provisioning engine 202 can include everything from the DNS to container infrastructure to gathering the containers, etc. The provisioning can also include user load, the container interconnection, the proxy server with NGINX, the certificates, the microservices interconnection, and the combination of containers/OpenSSL backend with OpenSSL user maintenance that allows singular provisioning of the entire solution from creation ("ripcord standup") to removal ("ripcord teardown").

For instance, to provision users for the communication system 200, the provisioning engine 202 can be programmed to access a user directory, such as the user directory of the system 100 for the entity. The provisioning engine 202 sends out a communication, such as an email or text, to a subset of the users in that directory, as defined by one or more attributes stored in the directory.

For instance, a subset of the users in the directory can be defined as "key" entries that should be provisioned in the communication system 200 upon the occurrence of a cyber security event. Examples of such users include leadership, managers, and IT personnel. These key users can include contact information that can be used to provision the users on the communication system 200 when needed.

For instance, the communication to these key users is ideally sent to a non-attributable email address for each of the users. Within the communication, an address such as a Uniform Resource Locator (URL) is provided to locate the communication system 200. In this example, the location is domain non-attributable to the entity. The communication also can include initial credentials for the user on the communication system 200, such as the user's username and initial password. Once the user accesses the URL and provides the username and initial password, the user can setup a new password and access the resources provided by the communication system 200, including such functions as email, chat, and event management. Many other configurations are possible.

The example build/remove engine 204 is programmed to build and remove the communication system 200. In one embodiment, the communication system 200 can be built and removed with minimal manual effort. For instance, the communication system 200 can provide a "single click" to initiate the building and provisioning of the communication system 200. Once the single click request is made, the provisioning engine 202 can be programmed to execute and provision the communication system 200.

Further, a single click can be used to remove the communication system 200 once the communication system 200 is no longer needed, such as after the cyber security event has been mitigated. Once the single click is received by the build/remove engine 204, the entirety of the communication system 200 is deleted from the server device 114. This includes all accounts and data associated with the communication system 200 being scrubbed from the server device 114. Further, the DNS entries associated with the communication system 200 are removed, and any billing associated with the communication system 200 is ceased.

In some examples, the single click can be the selection of an installation file that is executed. Upon receipt of execution, the communication system 200 is automatically installed and provisioned. In another example, the single click can be a control on a graphical user interface, such as a button on a portal webpage. Once selection of the control is received, the communication system 200 is automatically installed and provisioned. Other configurations are possible.

The example non-attribution and logging engine 206 is programmed to facilitate the communication system 200 while minimizing the public connection between the communication system 200 and the entity. Billing associated with the communication system 200, such as hosting and registration costs, can be associated with a third party entity that is unrelated to the entity owning the system 100.

For instance, the billing for the hosting services for the server device 114 can be done through a third party so that the public does not know that the entity leasing the server device 114 is the entity. Purchases can be done in cash or through other non-traceable payment mechanisms, if needed. All interaction between the cloud-based provider and the entity can be done out-of-band to preserve the anonymity of the resources running on the server device 114. Many other configurations are possible.

The non-attribution and logging engine 206 can also be programmed to log the activities on the communication system 200. For instance, the non-attribution and logging engine 206 can be programmed to do offsite logging through log streaming using the Apache Kafka (or other) distributed events streaming platform. Further, in this example, log analytics for the communication system 200 can be done using the Elastic Stack log data resources. These analytics can include full backups and migration to other servers. Many other tools can also be used. Additionally, the logging engine could be configured to archive logs as necessary to comply with regulatory or other requirements applicable to the entity.

Referring now to FIG. 3, additional details on the communication system 200 are shown. Generally, the communication system 200 can include one or more of the following.

The communication system 200 can include a proxy 302, such as a NGINX web server. The communication system 200 can also include a certificate engine 304 that auto-provisions SSL certificates.

The communication system 200 can further including a backend set of microservices, including one or more of the following: an event management system 310, a chat system 312; and a mail system 314.

The example information and event management system 310 is a stand-alone microservice that manages and streamlines the process of issue resolution for the system 100. More specifically, the event management system 310 provides tracking of items associated with the mitigation of the cyber security event (as well as any other desired issues). In this example, the event management system 310 logs various aspects of each issue, including such information as the context of each issue, along with other data like category of issue, priority of issue, status of issue, etc. The event management system 310 can therefore provide documentation of a particular problem, its current status, and other associated information.

The example chat system 312 is a stand-alone microservice that provides messaging services for the users of the communication system 200. In one example, the chat system 312 includes instant messaging services that allow users to send and receive messages. Other features, like delivery confirmations and read receipts can be provided. Further, in some examples, features like messaging lists and self-destructing or ephemeral messages can be sent. In yet other embodiments, the chat system 312 can provide audio/visual messaging services, too. For instance, the chat system 312 can be programmed to provide audio and/or video conferencing for users. Many configurations are possible.

The example mail system 314 is a stand-alone microservice that provides electronic mail services. In this example, the mail system 314 can provide all the typical services of a mail system, such as sending and receiving of emails, calendaring, contacts, tasking, etc. The mail system 314 can be programmed to synchronize with standard mail clients, if desired. In yet other embodiments, the mail system 314 can include alternative features, such as self-destructing or ephemeral messages. Many configurations are again possible.

In this example, an example portal 318 is provided to allow the users to easily access the event management system 310, the chat system 312, and the mail system 314. For instance, because each of the event management system 310, the chat system 312, and the mail system 314 is implemented as a separate microservice, the microservices can be executed in disparate locations or even moved over time. The portal 318 provides a single place where a user can access information for each of the microservices.

For instance, the users can access the portal 318 using a URL provided to the users upon provisioning. Upon authentication, the portal 318 provides links to each of the microservices, including the event management system 310, the chat system 312, and the mail system 314. If the location for one or more of the microservices is changed, the portal 318 can be updated to reflect the new location. For instance, current URLs for each of the microservices can be provided on the portal 318.

The communication system 200 can include a directory 320, such as OpenLDAP, which is an open source implementation of the Lightweight Directory Access Protocol (LDAP). This can include a password change system, a persistent data store (e.g., data store 322), and a centralized logging system (e.g., logging store 325). Users can be provisioned via the LDAP. All system passwords can be stored in encrypted config files separate from the code base for the communication system 200.

The data associated with the communication system 200 can be stored in the data store 322. In some examples, the data store 322 can be a database associated with the server device 114. The example data store can store such data as the communications flowing through the communication system 200, event associated with the communication system 200, etc. Additionally, data store 322 could be configured to implement encryption-at-rest, data classification requirements, or other requirements necessary based on the data contained and/or regulatory or other requirements applicable to the entity.

Further, the logging aspects for the communication system 200 can be captured by the logging store 325. In some examples, the logging store 325 can be stored on the server device 114 or perform logging remotely, as described above. Many configurations are possible.

As previously noted, the communication system 200 is non-attributable to the entity. This can be accomplished through a single billing account through third party obscured backend billing.

The communication system 200 can include infrastructure as code stored in a code repository, such as one provided by GitHub, Inc., for both Terraform and all subcomponents. The code will run on a Virtual Machine running a container program that is auto-provisioned using Terraform.

There can be a static Internet Protocol (IP) address that is auto-provisioned via Terraform via the cloud hosting provider (e.g., the server device 114). There can be four DNS addresses assigned (mail, chat, event management, password change) that point to the static IP (A Records), plus an MX record for the mail server to send and receive mail (this can be done via Terraform via the cloud hosting provider).

In this configuration, the communication system 200 can be deployed and removed efficiently. As previously noted, it is possible to "pull the ripcord" through minimal manual involvement (e.g., one click) to setup the communication system 200 in an emergency, such as the cyber security event. Likewise, it is possible to "pull the ripcord" to remove or otherwise destroy the communication system 200 when no longer needed. This results in the communication system 200 being an ephemeral self-provisioning discrete communication system with mail, event management, and asynchronous communication.

Figure 4:
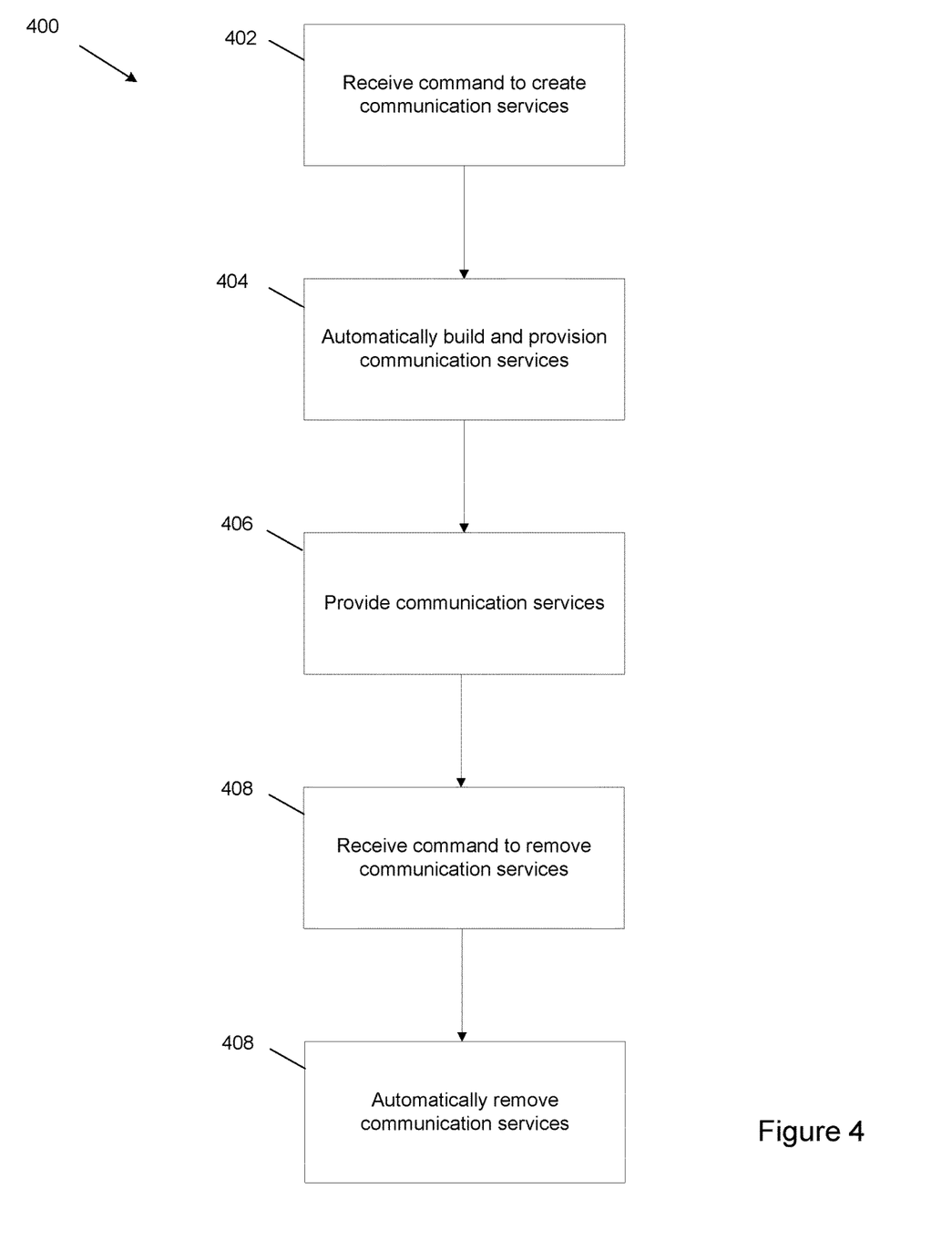
FIG. 4 shows an example method implemented by the system of FIG. 1.

Referring now to FIG. 4, an example method 400 for providing communication services is shown.

At operation 402, a command is received to create the communication services. As noted, this command can be as simply as the pushing of a button upon the identification of a cyber security event. Or, as detailed further below, the command can be automatically generated upon a certain event.

Next, at operation 404, the communication services are automatically built and provisioned. As noted, this can occur on a server that is not attributed to the entity.

Next, at operation 406, communication services are provided. This can include, without limitation, mail, chat, video conferencing, and/or event management.

Next, at operation 408, a command is received for removing the communication services. Similarly, the command can be as simply as clicking a button. This can occur, for instance, when normal communications have been restored for the entity.

Finally, at operation 408, the communication services are removed. This can be accomplished many ways, such as by deleting all the components of the communication services and ending the billing associated with the server space.

In another example, the command to create the communication services (for instance, at operation 402) can be initiated automatically. In such a scenario, assume an event that is sensed by the system 100 as being significant enough to automatically initiate the creation of the communication system 200. For instance, a catastrophic event, such as a ransomware attack, could automatically be sensed by the system 100, and the system 100 can be programmed to automatically initiate (e.g., according to a specific protocol) a non-attributable signal to create the communication system 200.

In such an example, the system can be programmed to scan the components of the system 100 and automatically generate containers and other cloud-based resources configured to identify possible adversaries and/or incidents. These containers can automatically create events and use technology, such as webhooks, to communicate the events.

All this can be driven through Artificial Intelligence (AI), with the AI growing more complex as more events are encountered. In such a scenario, the system can generate its own events and automatically notify the relevant parties of the events and possible remediation steps to address them.

Figure 5:
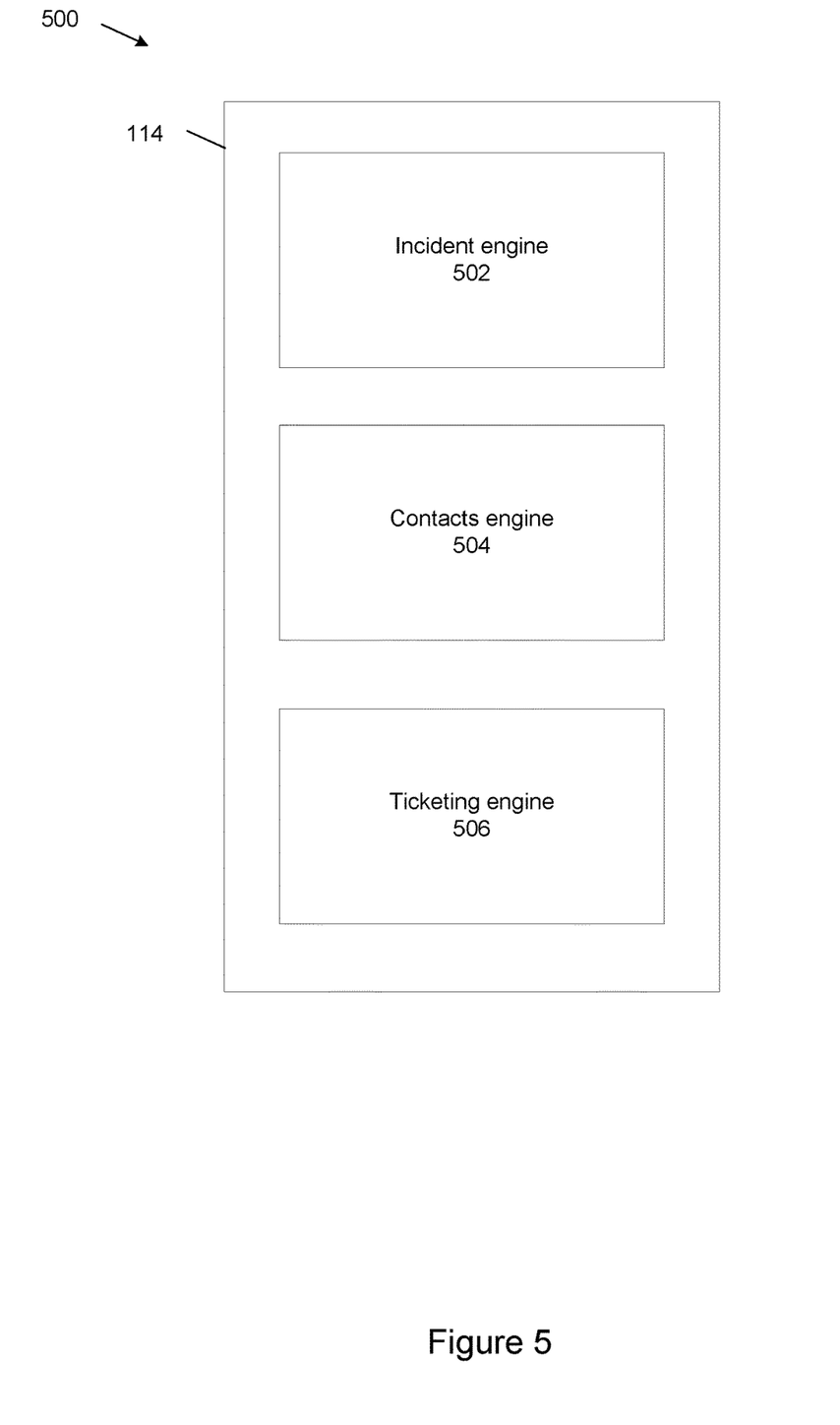
FIG. 5 shows example logical components of another communication system of the system of FIG. 1.

Referring now to FIG. 5, another embodiment of an example temporary self-provisioning communication system 500 created by the server device 114 is provided. The temporary self-provisioning communication system 500 is configured in a manner similar to the communication system 200 described above. However, in this instance, the server device 114 is also programmed to automatically provision various additional aspects of the temporary self-provisioning communication system 500 upon creation.

For instance, once the server device 114 is triggered to create the temporary self-provisioning communication system 500, a prewritten set of tickets, stored in a format such as Extensible Markup Language (XML) or JavaScript Object Notation (JSON), can be used to provision one or more of the event management system 310, the chat system 312, and the mail system 314.

This provisioning can include information about the specific event, contacts for users who are to be notified, and possible information about mitigation efforts. For example, the server device 114 can include trigger mechanisms for the various types of incidents as well as the groups/users who would be responsible for responding to each of the tickets associated with the mitigation efforts. The information for these individuals could be automatically loaded into the communication system 500 upon the trigger by the server device 114, as described below.

Specifically, the example server device 114 can include (in addition to the functionality described above for the server device 114 to instantiate the temporary self-provisioning communication system 200), an incident engine 502, a contacts engine 504, and a ticketing engine 506. These potential additional components of the server device 114 can be used to automatically provision the communication system 500 upon trigger and then automatically decommission the communication system 500 when the event is resolved.

In the example shown, the incident engine 502 is programmed to receive information about the cyber security event when the communication system 500 is created. For instance, the incident engine 502 can receive information from the server device 112 about the triggering cyber security event. In one example, the incident engine 502 can receive information about the event through APIs from various components of the system 100. In other examples, the incident engine 502 can also receive information about the cyber security event from third party systems.

Based on the triggering cyber security event, the incident engine 502 is programmed to identify and execute scripting to automate the provisioning of the communication system 500 to help remediate the event. In one example, a hierarchical JSON list is used to develop a series of tickets that are prepopulated with information based upon the type of event. The incident engine 502 analyzes the specific cyber security event that triggered the creation of the communication system 500 and selects one or more event types from the JSON list. These event types are then used to automate the provisioning of aspects of the communication system 500, such as prepopulating contacts, generating tickets for resolution of the event, etc.

For instance, assume that the incident engine 502 is prepopulated with a hierarchical list of possible events, including an event type A and an event type B.

1. Event Type A
   a. Triggering event: DDOS attack
   b. Contact list: contact list A
   c. Ticket list: ticket list A
2. Event Type B
   a. Triggering event: Unix attack
   b. Contact list: contact list B
   c. Ticket list: ticket list B The incident engine 502 is programmed to transverse the list and select the event type that matches the specific cyber security event. For instance, if the system 100 experiences a DDOS attack, the incident engine 502 is programmed to receive information about the attack and automatically select the "Event Type A" from the list by matching the triggering event to the event type.

If there is no matching event type in the list, the incident engine 502 can be programmed to select the closest matching event. Or, in some examples, the list can include one or more generic event types that can be used to provision the communication system 500 when a triggering cyber security event is not specifically addressed in the list. Many other configurations are possible.

The example contacts engine 504 is programmed to use the contact list A of the Event Type A to prepopulate groups and/or users in the chat system 312 and/or the mail system 314. In one example, the contacts engine 504 can receive a list of user names and use the LDAP to access contact information from the server device 112 for those users. There can be a hierarchy of user based upon the event types.

For instance, there can be a series of loops that are used to select users based upon the contact list A. In the instance of a DDOS attack, the groups and specific contacts who are responsible for DDOS data security can be included in the list and automatically provisioned in the communication system 500. Once provisioned, the users can be notified as described above to create the necessary accounts on the communication system 500.

The example ticketing engine 506 is programmed to use the ticket list A to automatically provision the event management system 310 with one or more tickets that are specific to the remediation of the cyber security event. This can include both automatic generation of the tickets and/or assignment of the tickets to one or more users as populated by the contacts engine 504. Through changes in status, the tickets can be automatically assigned priorities and updated appropriately.

For instance, for the event type A associated with a DDOS attack, tickets can be generated to identify which system(s) were breached and to reset credentials for the users of those systems. In such an example, the ticketing engine 506 is programmed to automatically generate those tickets within the event management system 310. Further, those tickets can be assigned to individuals designated by the contacts engine 504 to handle those types of tickets. As described above, the event management system 310 can thereupon be used to track the status of the tickets throughout the mitigation of the cyber security event.

Once the cyber security event has been mitigated, the entirety of the communication system 500 can be deleted from the server device 114, as described above. This includes all accounts and data associated with the communication system 500 being scrubbed from the server device 114. Further, the DNS entries associated with the communication system 500 are removed, and any billing associated with the communication system 500 is ceased.

Figure 6:
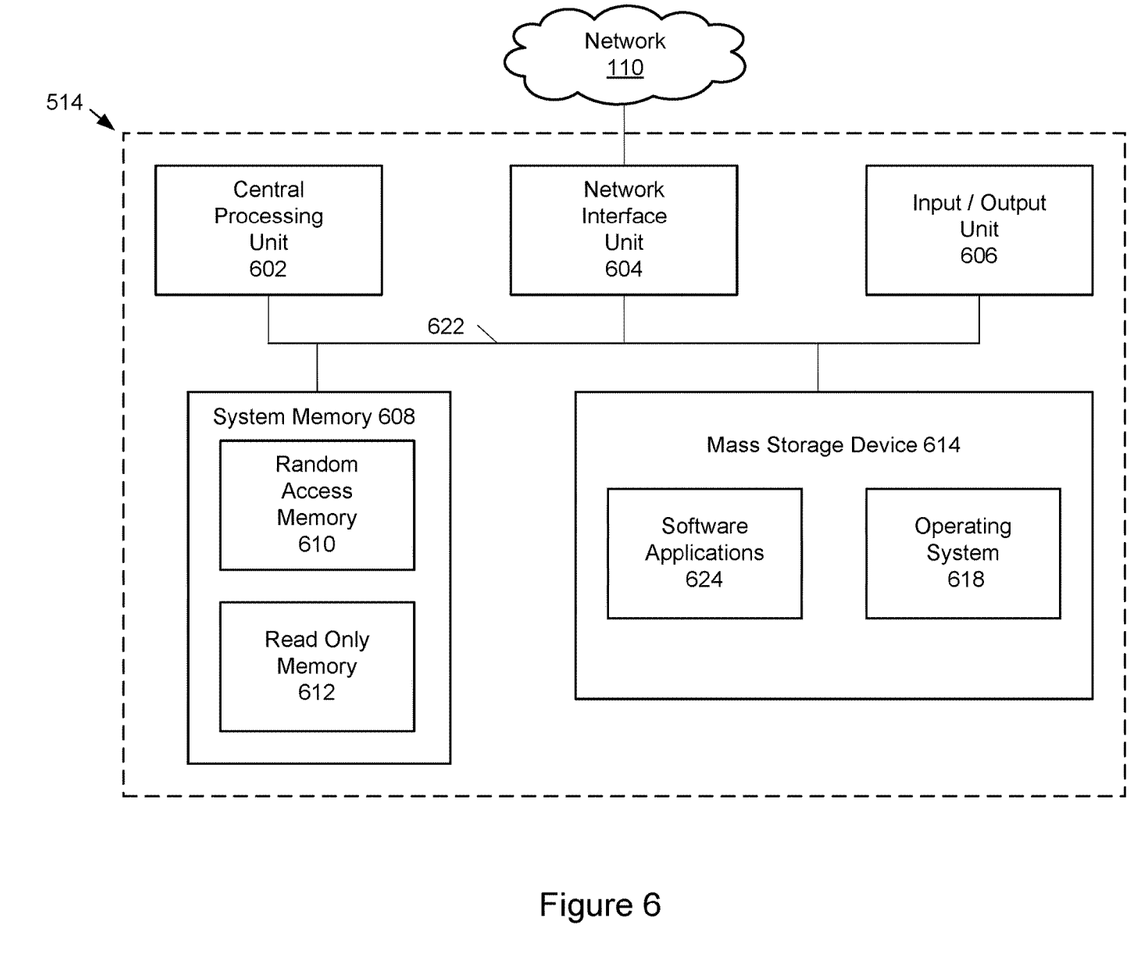
FIG. 6 shows example physical components of the communication system of FIG. 2.

As illustrated in the embodiment of FIG. 6, the example server device 114 which provides the communication services can include at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system containing the basic routines that help transfer information between elements within the server device 114, such as during startup, is stored in the ROM 612. The server device 114 further includes a mass storage device 614. The mass storage device 614 can store software instructions and data. A central processing unit, system memory, and mass storage device similar to that in FIG. 6 are also included in other computing devices disclosed herein (e.g., the devices 102, 104, 106, 112, 114).

The mass storage device 614 is connected to the CPU 602 through a mass storage controller (not shown) connected to the system bus 622. The mass storage device 614 and its associated computer-readable data storage media provide non-volatile, non-transitory storage for the server device 114. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 114.

According to various embodiments of the invention, the server device 114 may operate in a networked environment using logical connections to remote network devices through network 110, such as a wireless network, the Internet, or another type of network. The server device 114 may connect to network 110 through a network interface unit 604 connected to the system bus 622. It should be appreciated that the network interface unit 604 may also be utilized to connect to other types of networks and remote computing systems. The server device 114 also includes an input/output controller 606 for receiving and processing input from a number of other devices, including a touch user interface display screen or another type of input device. Similarly, the input/output controller 606 may provide output to a touch user interface display screen or other output devices.

As mentioned briefly above, the mass storage device 614 and the RAM 610 of the server device 114 can store software instructions and data. The software instructions include an operating system 618 suitable for controlling the operation of the server device 114. The mass storage device 614 and/or the RAM 610 also store software instructions and applications 624, that when executed by the CPU 602, cause the server device 114 to provide the functionality of the server device 114 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for providing a communication system, comprising:
   one or more processors; and
   non-transitory computer-readable storage media encoding instructions which, when executed by the one or more processors, causes the computer system to:
   receive a command to create the communication system based upon a cyber security event for an impacted system;
   automatically install and provision the communication system in a cloud computing environment that is unassociated with the impacted system;
   provide an event management microservice programmed to track issues associated with the impacted system, including provisioning the event management microservice with one or more tickets based upon a type of the cyber security event;
   provide a communication microservice programmed to facilitate communications between users of the communication system, including provisioning the event management microservice with one or more contacts based upon the type of the cyber security event;
   identify the type of the cyber security event; and
   select the type of the cyber security event from a hierarchical list of different cyber security events, wherein the hierarchical list of different cyber security events provides provisioning information for the communication system based upon the type of the cyber security event.

2. The computer system of claim 1, comprising further instructions which, when executed by the one or more processors, causes the computer system to:
receive a single second command to remove the communication system; and
automatically remove the communication system from the cloud computing environment.

3. The computer system of claim 1, wherein the provisioning information includes the one or more tickets to be added to the event management microservice and the one or more contacts to be added to the communication microservice.

4. The computer system of claim 3, wherein the provisioning information identifies a subset of the one or more contacts to be assigned to the one or more tickets.

5. The computer system of claim 1, comprising further instructions which, when executed by the one or more processors, causes the computer system to provide both a chat microservice and a mail microservice.

6. The computer system of claim 1, wherein the cloud computing environment is non-attributable to an entity associated with the computer system.

7. The computer system of claim 1, comprising further instructions which, when executed by the one or more processors, causes the computer system to log events associated with the communication system.

8. The computer system of claim 1, comprising further instructions which, when executed by the one or more processors, causes the computer system to create a directory programmed to provide directory information services for the communication system.

9. The computer system of claim 1, comprising further instructions which, when executed by the one or more processors, causes the computer system to create a provisioning engine programmed to:
setup a proxy to allow clients to connect with the event management microservice and the communication microservice;
generate digital certificates to secure the communications within the communication system; and
register users of the communication system within a directory.

10. A method for providing communication services, the method comprising:
receiving a command to create a communication system based upon a cyber security event for an impacted system;
automatically installing and provisioning the communication system in a cloud computing environment that is unassociated with the impacted system;
providing an event management microservice programmed to track issues associated with the impacted system, including provisioning the event management microservice with one or more tickets based upon a type of the cyber security event;
providing a communication microservice programmed to facilitate communications between users of the communication system, including provisioning the event management microservice with one or more contacts based upon the type of the cyber security event;
identifying the type of the cyber security event; and
selecting the type of the cyber security event from a hierarchical list of different cyber security events, wherein the hierarchical list of different cyber security events provides provisioning information for the communication system based upon the type of the cyber security event.

11. The method of claim 10, further comprising:
receiving a single second command to remove the communication system; and
automatically removing the communication system from the cloud computing environment.

12. The method of claim 10, wherein the provisioning information includes the one or more tickets to be added to the event management microservice and the one or more contacts to be added to the communication microservice.

13. The method of claim 12, wherein the provisioning information identifies a subset of the one or more contacts to be assigned to the one or more tickets.

14. The method of claim 10, further comprising providing both a chat microservice and a mail microservice.

15. The method of claim 10, wherein the cloud computing environment is non-attributable to an entity associated with the method.

16. The method of claim 10, further comprising logging events associated with the communication system.

17. The method of claim 10, further comprising creating a directory programmed to provide directory information services for the communication system.

18. The method of claim 10, further comprising:
setting up a proxy to allow clients to connect with the event management microservice and the communication microservice;
generating digital certificates to secure the communications within the communication system; and
registering users of the communication system within a directory.

* * * * *